US010606844B1

(12) United States Patent
Kumar et al.

(10) Patent No.: US 10,606,844 B1
(45) Date of Patent: Mar. 31, 2020

(54) METHOD AND APPARATUS FOR IDENTIFYING LEGITIMATE FILES USING PARTIAL HASH BASED CLOUD REPUTATION (71) Applicant: SYMANTEC, Mountain View, CA (US)

(72) Inventors: Kishor Kumar, Pune (IN); Shayak Tarafdar, Pune (IN)

(73) Assignee: CA, Inc., San Jose, CA (US)

( * ) Notice: Subject to any disclaimer, the term of this patent is extended or adjusted under 35 U.S.C. 154(b) by 886 days.

(21) Appl. No.: 14/960,073

(22) Filed: Dec. 4, 2015

(51) Int. Cl.
G06F 16/00 (2019.01)
G06F 16/2457 (2019.01)
G06F 21/56 (2013.01)

(52) U.S. Cl.
CPC ...... *G06F 16/24578* (2019.01); *G06F 21/565* (2013.01)

(58) Field of Classification Search
CPC ........ G06F 21/56; G06F 21/64; G06F 21/577; G06F 2221/2101; G06F 17/30115; G06F 21/564; G06F 21/565; H04L 63/123; H04L 63/14
See application file for complete search history.

(56) References Cited

U.S. PATENT DOCUMENTS

| | | | | |
|---|---|---|---|---|
| 6,021,510 A * | 2/2000 | Nachenberg | .......... | G06F 21/564 713/188 |
| 8,510,836 B1 * | 8/2013 | Nachenberg | .......... | H04L 63/145 706/12 |
| 8,627,463 B1 * | 1/2014 | Glick | ...................... | H04L 63/12 726/22 |
| 2004/0068757 A1 * | 4/2004 | Heredia | ................ | H04L 9/3247 725/135 |
| 2009/0044024 A1 * | 2/2009 | Oberheide | ............ | G06F 21/562 713/188 |
| 2010/0083376 A1 * | 4/2010 | Pereira | .................. | G06F 21/562 726/22 |

(Continued)

FOREIGN PATENT DOCUMENTS

GB 2469308 A * 10/2010 ........... G06F 21/564

OTHER PUBLICATIONS

Computational Intelligence in Data Mining—vol. 1, https://books.google.co.in/books?id=tgHRBQAAQBAJ&pg=PA568&lpg=PA568&dq=cloud+reputation+of+partial+file+hash&source=bl&ots=nFfGndnivs&sig=5yWMNazrFopes3FEdemzu2janwc, pp. 568-569.

(Continued)

*Primary Examiner* — Augustine K. Obisesan
(74) *Attorney, Agent, or Firm* — FisherBroyles, LLP (57) ABSTRACT Techniques are disclosed for identifying legitimate files using a hash-based cloud reputation using parts of a file to generate a hash value for reputation score lookup. A reputation service receives a request for a reputation score associated with a file. The request specifies a hash value for the file. The hash value is generated based on one or more parts of the file. The service identifies one of a plurality of file clusters that includes one or more files that matches to the specified hash value. The service determines a reputation score for the file based on the identified file cluster. The reputation score indicates a rating of the file based on a distribution of the file in a user base. The service returns the reputation score in response to the request.

20 Claims, 6 Drawing Sheets

(56) References Cited

U.S. PATENT DOCUMENTS

| | | | | |
|---|---|---|---|---|
| 2011/0067101 A1* | 3/2011 | Seshadri | ............... | G06F 21/552 726/22 |
| 2012/0017275 A1* | 1/2012 | Harmonen | .............. | G06F 21/56 726/24 |
| 2012/0151050 A1* | 6/2012 | Goncharov | ............. | G06F 21/10 709/224 |
| 2013/0097661 A1* | 4/2013 | Ma | ........................ | H04L 63/145 726/1 |
| 2014/0289853 A1* | 9/2014 | Teddy | ................. | H04L 63/1416 726/23 |

OTHER PUBLICATIONS

Bit9 Enhances Cloud-based Software Reputation Service, Multiple antivirus engine scanning technologies complement industry's most comprehensive repository of software reputation information, https://www.carbonblack.com/company/news/press-releases/12-31-13-bit9-enhances-cloud-based-software-reputation-service/, Dec. 31, 2013, 5 pages.

Sebastian Anthony, "How Dropbox knows you're a dirty pirate, and why you shouldn't use cloud storage to share copyrighted files," https://www.extremetech.com/computing/179495-how-dropbox-knows-youre-a-dirty-pirate-and-why-you-shouldnt-use-cloud-storage-to-share-copyrighted-files, 17 pages.

\* cited by examiner

FIG. 6

METHOD AND APPARATUS FOR IDENTIFYING LEGITIMATE FILES USING PARTIAL HASH BASED CLOUD REPUTATION

BACKGROUND

Field

Embodiments presented herein generally disclose techniques for improving computer security, and more specifically, to determining a reputation of a file being scanned by an antivirus application based on a partial hash of the file.

Description of the Related Art

Generally, an antivirus (AV) application scans files to detect known vulnerabilities (e.g., viruses, malware etc.). Some AV applications also provide reputation-based scoring that provides a security rating based on various characteristics of a given file, such as a source of the file, how new the file is, how common the file is within a user base, how the file might be associated with malware, etc. An AV application can identify new threats, modified threats, and targeted attacks based on the reputation score of the file. For example, a file that has a high reputation score might be unlikely to include malicious code, whereas a file that has a low reputation score might be more suspicious and warrant additional evaluation.

Typically, to obtain a reputation score for a file, the AV application queries a network service using a hash of the file as a key. Doing so allows the server to retrieve the reputation score (if the file is known) from the database and return the score to the AV application. The AV application may then determine whether to perform some action based on the reputation score (or lack thereof).

One drawback to the current approach of using a hash of a file to retrieve a reputation score is that modifications to a file results in the hash value also being modified. For example, if an application is updated (or otherwise changed), then the hash value for that application changes. Consequently, the updated application is an unknown file to the cloud database, which can result in unreliable information being returned to the AV application.

SUMMARY

One embodiment presented herein discloses a method. This method generally includes receiving a request for a reputation score associated with a file. The hash value is generated based on one or more parts of the file. The method also includes identifying one of a plurality of file clusters that includes one or more files that matches to the specified hash value. A reputation score is determined for the file based on the identified file cluster. The reputation score indicates a rating of the file based on a distribution of the file in a user base. The reputation score is returned in response to the request.

Another embodiment includes a non-transitory computer-readable storage medium storing instructions, which, when executed on a processor, perform an operation. This operation includes receiving a request for a reputation score associated with a file. The hash value is generated based on one or more parts of the file. The operation also includes identifying one of a plurality of file clusters that includes one or more files that matches to the specified hash value. A reputation score is determined for the file based on the identified file cluster. The reputation score indicates a rating of the file based on a distribution of the file in a user base. The reputation score is returned in response to the request.

Yet other embodiment includes a system having a processor and a memory. The memory has program code, which, when executed on a processor, performs an operation. This operation includes receiving a request for a reputation score associated with a file. The hash value is generated based on one or more parts of the file. The operation also includes identifying one of a plurality of file clusters that includes one or more files that matches to the specified hash value. A reputation score is determined for the file based on the identified file cluster. The reputation score indicates a rating of the file based on a distribution of the file in a user base. The reputation score is returned in response to the request.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented herein disclose techniques for retrieving a reputation score for a file based on a hash generated from one or more parts of that file that are likely to remain consistent across multiple versions of the file. Examples of such parts include sections of executable code of the file, file headers, arbitrary bytes and the like. In one embodiment, a cloud provider includes a clean database service. The clean database service maintains a repository of files identified as legitimate, i.e., files that have been previously determined to not include malware (or other vulnerability that could compromise a computer system).

In one embodiment, a reputation tool calculates a hash for each file in the clean database service repository. More specifically, the reputation tool may calculate a hash based on one or more portions of the file that are likely to remain identical across different versions of the file. The reputation tool may generate the hash based on a set of hashing rules that provide a consistency in determining what parts of the file to generate a hash value from. For example, the reputation tool creates a hash from a specified portion of the file, such as of the first x bits, the first non-empty section of the file, an entry point of the file (i.e., the starting point of code in a file executable), etc., or some combination of each. Further, the reputation tool may also include a vendor name associated with the file in generating the hash.

In one embodiment, the reputation tool clusters files based on identical hash values. Once clustered, the reputation tool can determine a reputation score for each cluster based on the number of files included in the file cluster. In addition, if a vendor is associated with the cluster, the reputation score associated with the cluster may be adjusted based on a specified trust-level of the vendor, where a cluster associated with a highly-trusted vendor may have a higher reputation score relative to a cluster associated with a vendor having a lower trust level.

In one embodiment, an antivirus (AV) application scans files stored on a computer for malware and other vulnerabilities. The AV application may use the reputation scoring provided by the cloud provider to determine whether to take some remedial action based on a reputation score of a given file. For each file scanned, the AV application calculates a hash for that file using the same hashing techniques performed by the reputation tool for the parts of the file (e.g., the first x bytes of the file, a first section of non-empty data in the file, etc.). The AV application sends the resulting file hash to the cloud provider. In turn, the reputation tool determines whether the file hash matches a file hash associated with a given cluster. If so, the reputation tool retrieves the reputation score associated with that cluster and returns the score to the AV application.

Advantageously, maintaining reputation scores for file clusters provides a more flexible approach to querying a cloud provider for a reputation score for a given file. Rather than query into a cloud database using a hash of an entire file, an AV application can obtain a reputation score for that file using a hash generated from one or more portions of the file likely to remain consistent across different versions of the file. Under this approach, even if a known file is later updated, it is likely that a resulting hash of the updated file retains the same hash corresponding to the original file. As a result, the cloud provider is less likely to return a false positive indicating that the updated file is an unknown one.

Figure 1:
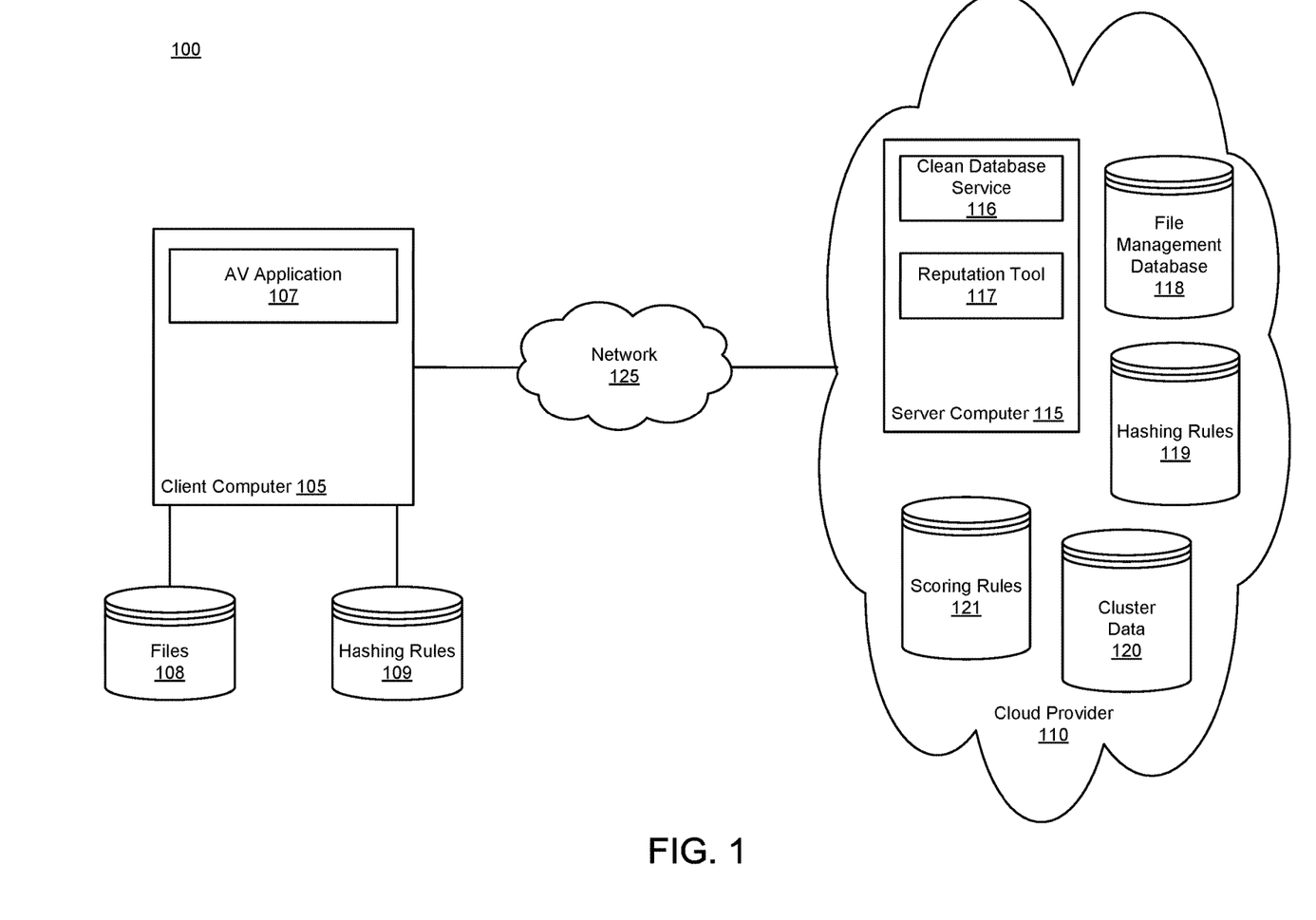
FIG. 1 illustrates an example computing environment, according to one embodiment.

FIG. 1 illustrates an example computing environment 100, according to one embodiment. As shown, the computing environment 100 includes a client computer 105 and a cloud provider 110, each interconnected via a network 125 (e.g., the Internet). In one embodiment, the client computer 105 may represent a physical computing system (e.g., a desktop, laptop, or a tablet computer) or a virtual computing instance executing in a cloud network.

The client computer 105 includes an AV application 107, one or more files 108, and one or more hashing rules 109. The AV application 107 monitors activity in the client computer 105 and removes malicious software (e.g., viruses, malware, spyware, etc.) detected in the client computer 105. For example, to detect some forms malicious software, the AV application 107 may scan the files 108 against known malware signatures.

As described below, the AV application 107 may evaluate a given file 108 based on a reputation score associated with that file. Reputation scoring classifies known files based on a distribution (or lack thereof) across a given user base. A reputation score can be based on various attributes associated with a given file, such as a source of the file, how new the file is, how common the file is within a user base, file history, etc. Reputation scoring allows the AV application 107 to detect new threats, mutated threats, and targeted attacks that are not as detectable using a known signature approach.

In one embodiment, the cloud provider 110 includes a server computer 115, a file management database 118, one or more hashing rules 119, cluster data 120, and scoring rules 121. The server computer 115 further includes a clean database service 116 and a reputation tool 117. In one embodiment, the AV application 107 serves as an agent application for the cloud provider 110. For example, the AV application 107 may evaluate files 108 based on virus definitions and malware signatures provided by the cloud provider 110. Further, the clean database service 116 maintains the file management database 118. The file management database 118 provides a repository of files within the user base. The file management database 118 may include metadata for each file describing source information, file age, malware incidents related to the file, etc.

In one embodiment, the reputation tool 117 determines reputation scores based on file clusters associated with a given hash value. The reputation tool 117 calculates a hash of each file maintained in the file management database 118 based on hashing rules 119. Hashing rules 119 may indicate which part (or parts) of the file to use as input for a hashing algorithm. For example, hashing rules 119 may specify that the first 512 bytes of the file should be hashed. The hashing rules 119 may also specify that vendor information associated with the file should be included as input for generating the file hash.

Further, the reputation tool 117 may identify clusters of files having hash values that match with one another (as cluster data 120). The reputation tool 117 may then determine a reputation score for each cluster based on scoring rules 121. The scoring rules 121 provide various criteria for rating a given file cluster. For instance, the scoring rules 121 may specify trust levels for vendors associated with certain files.

For example, a vendor that is established within the user base (e.g., has a number of applications not associated with malware, used in an enterprise environment, etc.) may be associated with a high trust level. As another example, a vendor that is not as established within the user base may be associated with a lower trust level. The scoring rules 121 may specify that clusters associated with a high trust vendor and a specified threshold of files should have a relatively high reputation score. The reputation score may have a lower value for clusters associated with lower-trust level vendors as well as a fewer amount of files.

To retrieve a reputation score for a given file 108, the AV application 107 calculates a partial file hash based on hashing rules 109 (which match the hashing rules 119 to maintain consistency in resulting file hashes). The AV application 107 sends the hash to the reputation tool 117. The reputation tool 117 uses the file hash as a key for the cluster data 120 to determine a cluster having a file hash that matches the hash received from the AV application 107.

In one embodiment, the reputation tool 117 retrieves the reputation score associated with the cluster and returns the reputation score to the AV application 107. In turn, the AV application 107 determines whether to perform some remedial (or precautionary) action based on the reputation score, e.g., quarantining the file, restricting access to the file, generating an alert to an administrator, etc.

Figure 2:
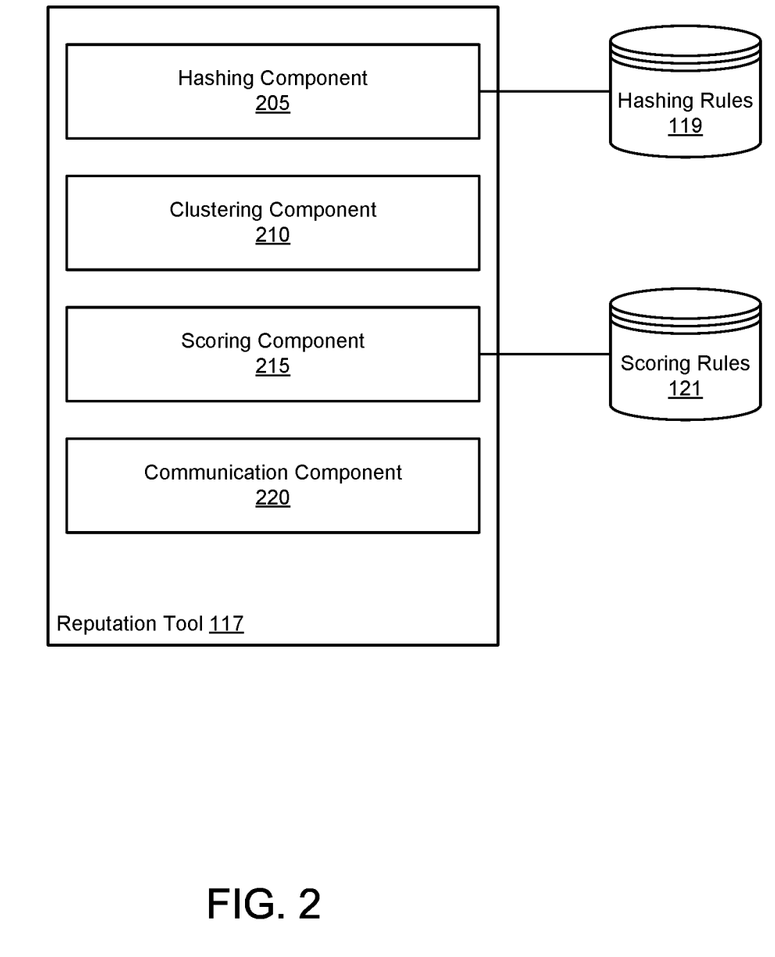
FIG. 2 further illustrates the reputation tool described relative to FIG. 1, according to one embodiment.

FIG. 2 further illustrates the reputation tool 117 described relative to FIG. 1, according to one embodiment. As shown, the reputation tool 117 includes a hashing component 205, a clustering component 210, a scoring component 215, and a communication component 220.

In one embodiment, the hashing component 205 calculates partial hash values of files maintained by the file management database 118 using some hashing algorithm, e.g., SHA-2, MD5, etc. The hashing component 205 may calculate the partial hash based on specified hashing rules 119. The hashing rules 119 may specify that the hash value is derived from various parts of a given file.

For example, the hashing component 205 may generate a hash from the first 512 bytes of the file. As another example, the hashing component 205 may generate the hash from the first 512 bytes of a non-empty section of a file at different offsets (e.g., from offset 0, from offset 4k, from offset 9k, from offset 12k, etc. As yet another example, the hashing component 205 may generate the hash from an entry point into the file from a given offset. As another example, the hashing component 205 may generate the hash value from a start of appended data from a given offset. As yet another example, the hashing component 205 may generate the hash value from an import name table for the file. As known, an import name table for a given file includes a name of a function of the file, names of any drivers associated with the file, etc.

In addition, the hashing component 205 may generate the hash value from a combination of the above described methods (and other methods). For example, the hashing component 205 may generate the hash value from the first non-empty section of the file at each of the different offsets as well as the import name table.

Further, the hashing component 205 may generate hash values from each of the specified hashing rules 119 and organize each value into buckets. Further still, the hashing component 205 may include vendor name information as another source of input when generating the hash value. Doing so allows similar files from that vendor to be more easily identified during a lookup of the reputation score for a given file.

In one embodiment, the clustering component 210 identifies files having matching partial hash values. The clustering component 210 clusters the files based on the matching partial hash values. As a result, distinct files having similar properties (e.g., different versions of the same application) may be organized into clusters.

In one embodiment, the scoring component 215 evaluates the clusters based on scoring rules 121. The scoring rules 121 specify criteria for rating a given cluster. For instance, the scoring rules 121 may specify rating the cluster based on an amount of files present in the cluster relative to a trust level of a vendor associated with the cluster (if any), as well as relative to attributes associated with the file (e.g., file age, source, etc.).

As an example, assume that a cluster is associated with a vendor having a highest trust level. In such a case, if the cluster has over 100 files, then the files associated with the cluster have a highest reputation score. In contrast, assume that another cluster is associated with a vendor having a relatively low trust level. In such a case, the cluster may have a relatively lower reputation score.

The communication component 220 receives requests from AV applications within a user base for returning a reputation score for a specified file. A given request may include a hash value generated from one or more parts of the file (based on a set of hashing rules). The communication component 220 may send the file hash to the clustering component which in turn identifies a corresponding file cluster. The communication component 220 also sends reputation scores to AV applications.

Figure 3:
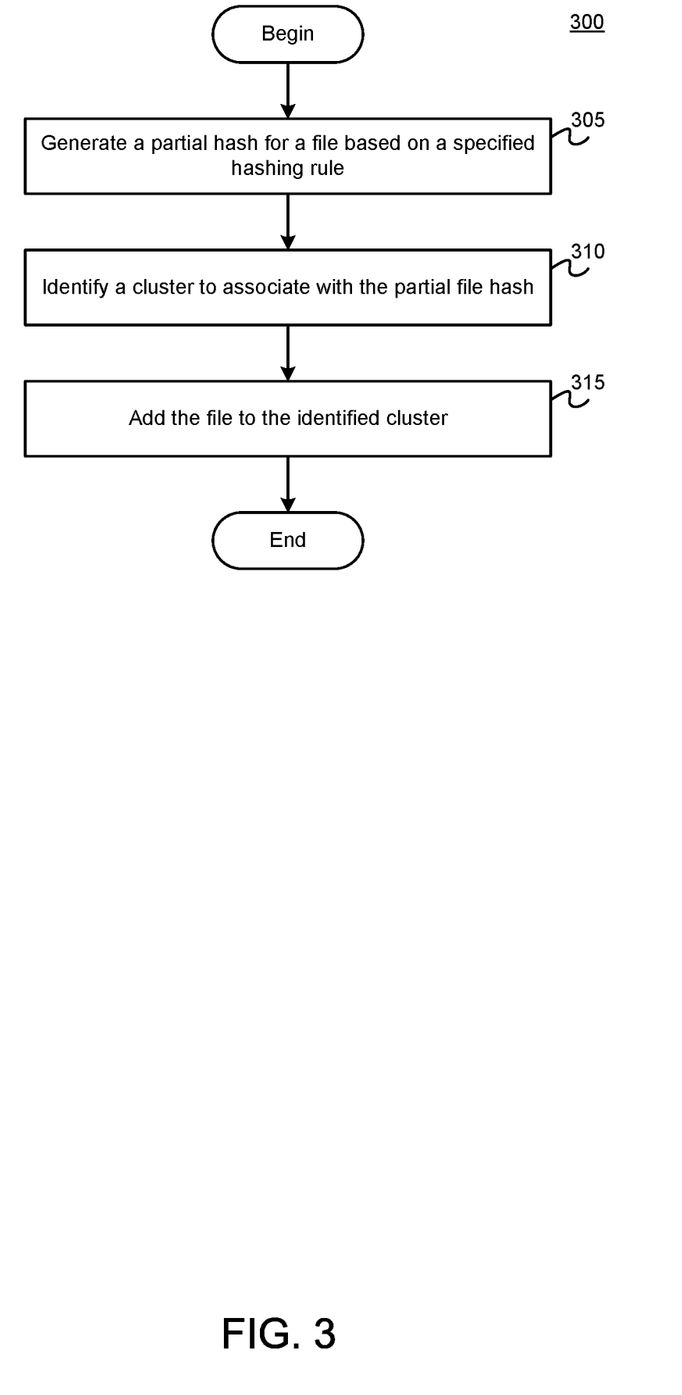
FIG. 3 illustrates a method for clustering files based on a corresponding partial file hash, according to one embodiment.

FIG. 3 illustrates a method 300 for clustering files based on a corresponding file hash, according to one embodiment. In particular, method 300 describes the reputation tool 117 assigning a given file (in the file management database 118) to a corresponding cluster.

As shown, method 300 begins at step 305, where the hashing component 205 generates a hash for a file based on a specified hashing rule (e.g., from hashing rules 119). For example, assume that the hashing rules 119 specify generating a hash from the first 512 bytes of appended data. In such a case, the hashing component 205 identifies the first 512 bytes of any appended data in the file to generate the hash. As stated, the hashing rules 119 may specify that the hash value be generated from a combination of inputs. For example, in addition to the first 512 bytes of appended data, the hashing component 205 may also generate the partial hash value from an import name table corresponding to the file, a vendor/producer name, and the like.

At step 310, the clustering component 210 identifies a cluster to associate with the file hash. To do so, the clustering component 210 determines whether a cluster having files with hash values that match the generated hash exists. If so, then at step 315, the scoring component 215 adds the file to the identified cluster. The scoring component 215 may increment a file count for that particular cluster. If a cluster does not currently exist for that file hash, the clustering component may associate a new cluster for that file.

As stated, scoring component 215 may determine a reputation score for each cluster based on an amount of legitimate files included in the cluster as well as attributes of the files within the cluster. The reputation score may also be based on a vendor associated with the files of the cluster. As a result, when an AV application requests a reputation score form the reputation tool 117, the scoring component 215 may evaluate the cluster for the amount of files, attributes, and vendor information.

Figure 4:
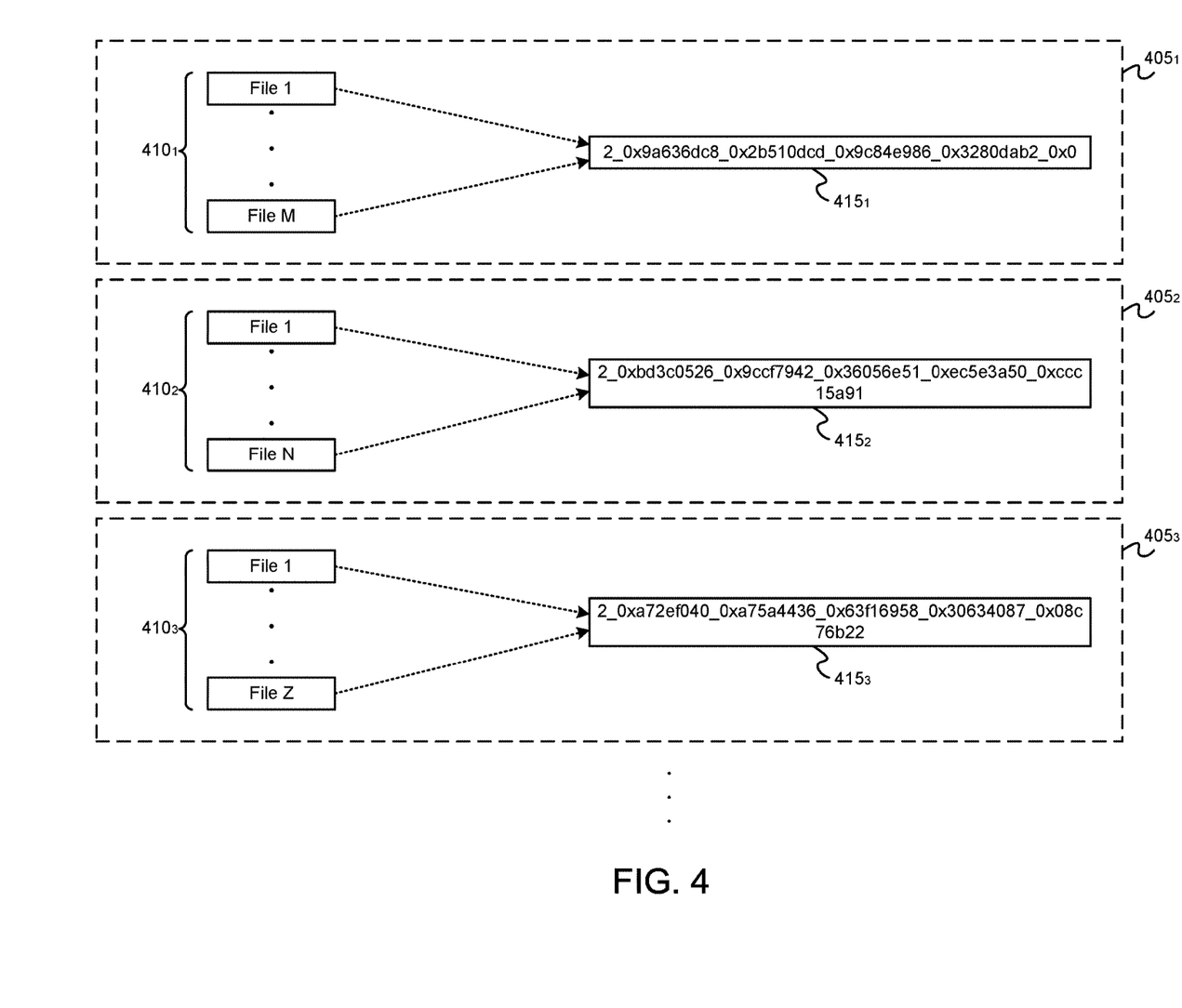
FIG. 4 illustrates example partial file hash clusters, according to one embodiment.

FIG. 4 illustrates example file clusters $405_{1-3}$, according to one embodiment. Of course, the reputation tool 119 may manage a number of file clusters. Illustratively, each of the clusters 405 include a number of files $410_{1-3}$. Each file is associated with a file hash $415_{1-3}$. For example, cluster $405_1$ includes a number of files 1-M $410_1$. Each of the files $410_1$ has a hash value $415_1$ of 2_0x9a636dc8_0x2b510dcd_0x9c84e986_0x3280dab2_0x0.

As stated, a hash value may be obtained using a combination of parts of a file. In this example, the hash value $415_1$ was generated based on the first non-empty section of the file at each specified offset, as well as a corresponding import name table for the file.

For instance, the "0x9a636dc8" portion may correspond to the first non-empty section of the file from offset 0 to 512, the "0x2b510dcd" portion may correspond to the first non-empty section of the file from offset 513 to 1024, and so on. By generating the hash from different parts of the file, the reputation tool allows distinct files with common parts to be included in a given cluster.

As a result, even if a given file is later updated (therefore changing the full hash of the file), the partial file hash is likely to remain identical. Advantageously, an AV application may use the partial file hash to obtain the reputation score from the cloud provider.

Figure 5:
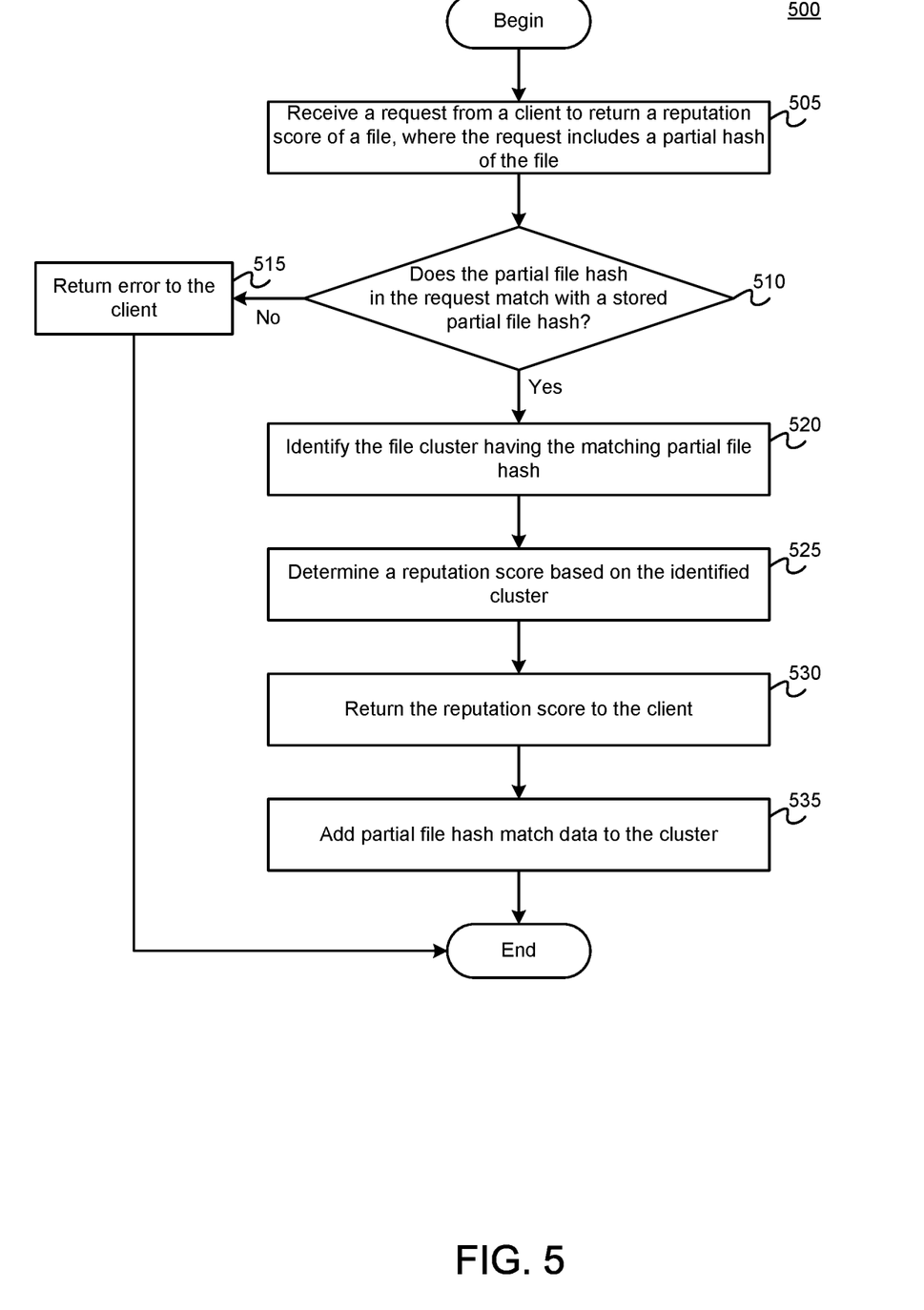
FIG. 5 illustrates a method for retrieving a reputation score for a file using a partial hash of the file, according to one embodiment.

FIG. 5 illustrates a method 500 for retrieving a reputation score for a file using a partial hash of the file, according to one embodiment. As shown, method 500 begins at step 505, where the communication component 220 receives a request from an AV application for returning a reputation score for a given file. The request may specify a hash of the file, where the hash is generated according to specified hashing rules.

At step 510, the clustering component 210 determines whether the partial file hash specified in the request matches a file hash associated with a given cluster. If not, then at step 515, the communication component 220 returns an error to the AV application. In turn, the AV application may perform some precautionary action in response (e.g., quarantining the file, generating an alert for the client, etc.). Otherwise, at step 520, the clustering component 210 identifies the cluster associated with the file hash.

At step 525, the scoring component 215 determines a reputation score for the file based on the identified cluster and specified scoring rules. As stated, the scoring component 215 may score the identified cluster based on a number of files associated with the cluster, attributes of the files associated with the cluster, and vendor information associated with the cluster. For instance, the scoring component 215 may generate a relatively high score for a cluster (and file), where the cluster is associated with a high trust level vendor, and where the cluster includes a specified number of files.

At step 530, the communication component 220 returns the reputation score to the AV application. In turn, the AV application may perform some action based on the reputation score. For example, if the reputation score is relatively low, the AV application may perform some remedial action (e.g., quarantine the file, generate a warning, limit access to the file, etc.). At step 535, the clustering component 210 may optionally add the partial file hash data associated with the file to the cluster. For instance, the clustering component 210 may increment a file count for that cluster.

Figure 6:
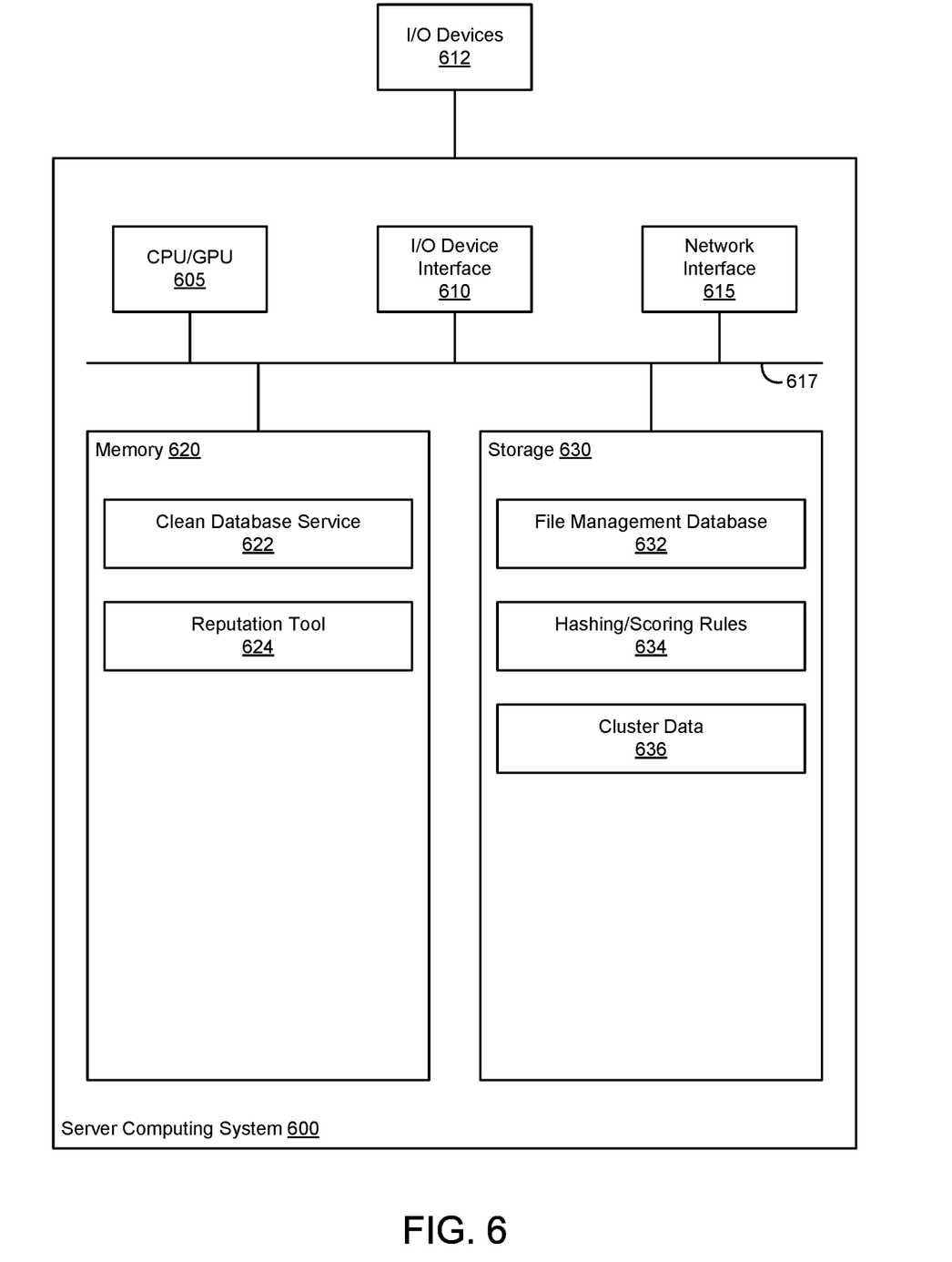
FIG. 6 illustrates an example computing system configured to retrieve a reputation score for a file using a partial hash of the file, according to one embodiment.

FIG. 6 illustrates an example server computing system 600 configured to retrieve a reputation score for a file using a hash generated from one or more portions of the file, according to one embodiment. As shown, server computing system 600 includes, without limitation, a central processing unit (CPU) 605, a network interface 615, a memory 620, and storage 630, each connected to a bus 617. The client computing system 600 may also include an I/O device interface 610 connecting I/O devices 612 (e.g., keyboard, display, mouse devices, etc.) to the server computing system 600.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes a clean database service 622 and a reputation tool 624. And storage 630 includes a file management database 632, one or more hashing/scoring rules 634, and cluster data 636. The clean database service 622 maintains a database of legitimate files. The reputation tool 624 generates hashes of each file in the database based on the hashing rules 634 specifying one or more portions of the file to use as input for generating the hash. Further, the reputation tool 624 identifies clusters of files associated with each generated file hash. The reputation tool 624 may then score each cluster based on scoring rules 634.

Further, the reputation tool 624 receives requests from antivirus (AV) applications for reputation scores for specified files. The reputation tool 624, in response to receiving a request, determines whether a file hash included in the request matches with any file hash associated with a cluster. If so, then the reputation tool 624 determines a reputation score associated with the identified cluster. The reputation tool 624 may return the reputation score to the requesting AV application.

The preceding discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s).

In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The following discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s).

In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for identifying files, at least a portion of the method being performed by one or more computing devices comprising at least one processor, the method comprising:
   receiving, at the one or more computing devices via a network, a request for a reputation score associated with a first file, wherein the request specifies a first hash value for the first file, wherein the first file includes a plurality of updating portions and a plurality of non-updating portions, and wherein the first hash value is generated as a combination of hashes associated with at least some of the plurality of non-updating portions of the first file;
   identifying, at the one or more computing devices, one of a plurality of file clusters that includes one or more files, wherein hash values of the one or more files match the first hash value;
   determining, at the one or more computing devices, the reputation score associated with the first file based on the identified file cluster, wherein the reputation score indicates a rating of the first file based on a distribution of the first file in a user base; and
   transmitting, over the network, an indication of the reputation score in response to the request.

2. The method of claim 1, wherein the reputation score is further determined based on an amount of files in the identified file cluster and on a trust level of a vendor associated with the one or more files in the identified file cluster.

3. The method of claim 1, wherein each of the file clusters is associated with a hash value generated from one or more parts of the one or more files included in the identified file cluster.

4. The method of claim 1, wherein the non-updating portions of the first file include at least one of a first non-empty section of the first file, an entry point to the first file, appended data of the first file, or an import name table.

5. The method of claim 4, wherein the non-updating portions of the first file further include a vendor name.

6. The method of claim 1, further comprising:
   associating the first file with the identified file cluster.

7. The method of claim 1, wherein the request is sent by an antivirus application and wherein the method further comprises:
   receiving, by the antivirus application, the indication of the reputation score;
   determining, by the antivirus application that a remedial action should be taken with regard to the first file based on the reputation score; and
   performing, by the antivirus application, the remedial action.

8. The method of claim 7, wherein the remedial action comprises one or more of: quarantining the first file, restricting access to the first file, and generating an alert to an administrator.

9. A non-transitory computer-readable storage medium storing instructions, which, when executed on a processor, perform an operation for identifying files, the operation comprising:

receiving, at one or more computing devices via a network, a request for a reputation score associated with a first file, wherein the request specifies a first hash value for the first file, wherein the first file includes a plurality of updating portions and a plurality of non-updating portions, and wherein the first hash value is generated as a combination of hashes associated with at least some of the plurality of non-updating portions of the first file;

identifying, at the one or more computing devices, one of a plurality of file clusters that includes one or more files, wherein hash values of the one or more files match the first hash value;

determining the reputation score associated with the first file based on the identified file cluster, wherein the reputation score indicates a rating of the first file based on a distribution of the first file in a user base; and transmitting, over the network, an indication of the reputation score in response to the request.

10. The computer-readable storage medium of claim 9, wherein the reputation score is further determined based on an amount of files in the identified file cluster and on a trust level of a vendor associated with the one or more files in the identified file cluster.

11. The computer-readable storage medium of claim 9, wherein each of the file clusters is associated with a hash value generated from one or more parts of the one or more files included in the identified file cluster.

12. The computer-readable storage medium of claim 9, wherein the non-updating portions of the first file include at least one of a first non-empty section of the first file, an entry point to the first file, appended data of the first file, or an import name table.

13. The computer-readable storage medium of claim 9, wherein the operation further comprises:

associating the first file with the identified file cluster.

14. The computer-readable storage medium of claim 9, wherein the request is sent by an antivirus application and wherein the operation further comprises:

receiving, by the antivirus application, the indication of the reputation score;

determining, by the antivirus application that a remedial action should be taken with regard to the first file based on the reputation score; and performing, by the antivirus application, the remedial action.

15. The computer-readable storage medium of claim 14, wherein the remedial action comprises one or more of: quarantining the first file, restricting access to the first file, and generating an alert to an administrator.

16. A system for identifying files, the system comprising:

a processor; and a memory storing code, which, when executed on the processor, performs an operation comprising:

receiving, at one or more computing devices via a network, a request for a reputation score associated with a first file, wherein the request specifies a first hash value for the first file, wherein the first file includes a plurality of updating portions and a plurality of non-updating portions, and wherein the first hash value is generated as a combination of hashes associated with at least some of the plurality of non-updating portions of the file;

identifying, at the one or more computing devices, one of a plurality of file clusters that includes one or more files, wherein hash values of the one or more files match the first hash value;

determining the reputation score associated with the first file based on the identified file cluster, wherein the reputation score indicates a rating of the first file based on a distribution of the first file in a user base; and transmitting, over the network, an indication of the reputation score in response to the request.

17. The system of claim 16, wherein the reputation score is further determined based on an amount of files in the identified file cluster and on a trust level of a vendor associated with the one or more files in the identified file cluster.

18. The system of claim 16, wherein the non-updating portions of the first file include at least one of a first non-empty section of the first file, an entry point to the first file, appended data of the first file, or an import name table.

19. The system of claim 16, wherein the request is sent by an antivirus application, the operation further comprising:

receiving, by the antivirus application, the indication of the reputation score;

determining, by the antivirus application that a remedial action should be taken with regard to the first file based on the reputation score; and performing, by the antivirus application, the remedial action.

20. The system of claim 19, wherein the remedial action comprises one or more of: quarantining the first file, restricting access to the first file, and generating an alert to an administrator.

* * * * *